Jan. 27, 1970     R. AMBROS     3,491,610
DEVICE FOR TRANSMISSION OF A TURNING MOMENT
OR TORQUE FROM A DRIVING PART
TO A DRIVEN PART
Filed Aug. 28, 1967     8 Sheets-Sheet 1

Fig. 7

United States Patent Office 3,491,610
Patented Jan. 27, 1970

3,491,610
DEVICE FOR TRANSMISSION OF A TURNING MOMENT OR TORQUE FROM A DRIVING PART TO A DRIVEN PART
Richard Ambros, 46 Grunberger Strasse, Nuremberg, Germany
Filed Aug. 28, 1967, Ser. No. 663,616
Claims priority, application Germany, Sept. 2, 1966, A 53,416
Int. Cl. F16h 55/56
U.S. Cl. 74—230.17        13 Claims

ABSTRACT OF THE DISCLOSURE

A variable torque transmission device including a pair of relatively adjustable pulley sections for driving a shaft, the rotation of the driven shaft effecting the distance between the pulley sections, the pulley is connected for rotation with a ring having an eccentric bore and a support bearing connected to a torsion spring; the angular position of the eccentric ring with respect to the support bearing is adjustable which effects the initial force on the torsion spring. The spring in turn drives a transmission element which is connected by a guide and pin means to a circular lever eccentrically mounted within the bore in the eccentric ring, the axis of rotation of which varying due to rotation of the eccentric ring. The eccentric lever is connected by a further guide and pin means to a hub which is connected to drive the driven shaft.

---

The present invention relates to a device for transmitting torque from a driving part to a driven part.

Automatically controlled transmission systems so-called automatic torque converters have definite torque/r.p.m. characteristic, and are becoming increasingly important in vehicle propulsion systems winding and analogous gear. If the secondary torque increases in a vehicle propulsion system due to, for example, an increasing gradient, the automatic torque converter has the task of regulating the transmission ratio between the driving and driven parts to compensate for increased torque. Conversely, in the case of a winding gear drive, if the transmission ratio between the driving and driven parts changes owing to the increasing or decreasing diameter of the coil or roll during winding or unreeling, the automatic torque converter has the task of regulating torque transmission, relative to the winding shaft, in such manner that the tension of the product to be wound or unreeled remains constant.

It is known to organise torque converters in such manner that transmission of power at constant input r.p.m., for example in vehicle propulsion systems or winding gear mechanisms, or at constant output r.p.m., for example in the case of an unreeling mechanism. So-called hydraulic torque converters are known for vehicle propulsion systems, their efficiency is low however. Costly, electrically controlled torque converters, which fulfil the most stringent requirements, are known for winding systems. For more modest requirements, infinitely variable gears are employed, comprising two pairs of cone pulleys connected by a linkage and a V-section chain belt running between these, which are controlled exclusively by means of axially directed forces. A torque converter of this kind has been described, for example, in the German patent specification 948,931.

A disadvantage of such gear is that the axially directed controlling forces are considerably greater than the tangential forces of the torque to be transmitted. The gear system itself must therefore be protected against the actions of the control mechanism. Shock-absorbers must be incorporated for example, owing to the impact stresses. Care should be taken moreover to ensure that faulty reactions of the control mechanism operated by a weight for example, are not transmitted to the driving or driven elements, which may be a web of fabric. A further disadvantage is that the control mechanism is extremely sluggish and that sensitivity of control is correspondingly poor, owing to the multiplicity of the parts required (weights, transmission linkages, shock absorbers).

In view thereof, an object of the invention is to create a device of the nature cited initially, in which a control force for regulation of the transmission ratio is tangential, and in which this control force does not have any component in the an axial component. A device of this nature is an automatic torque converter in combination with an infinitely variable gear system. The control of the device is as free of friction and inertia as possible and is highly sensitive. The efficiency is substantially greater than that of hydraulic torque converters. The device should be as robust as possible moreover, and axially directed control forces should be eliminated. The structure of the device should be kept simple in order to ensure low production cost by efficient methods of manufacture, and allow for a variety of possible applications.

The invention consists in a variable torque transmission device for transmitting torque from a pair of pulley sections to a driven shaft comprising: means connected for rotation with the pulley about the axis of rotation of the driven shaft, including an eccentric ring, a lever eccentrically arranged for rotation by the eccentric ring about an axis parallel to the axis of rotation of the driven shaft, a pair of transmission elements connected for rotation with the eccentric lever about the axis of rotation of the driven shaft, one of the transmission elements arranged for driving the eccentric lever and the other transmission element connected to the driven shaft and arranged to be driven by the eccentric lever so that due to rotation of the eccentric ring the position of the axis of rotation of the eccentric lever varies which in turn varies the torque transmitted to the driven shaft.

The invention further consists in a variable torque transmission device of the type including a pair of pulley sections, a driven shaft operatively connected to the pulley sections for rotation about its axis, means for adjusting the distance between the pulley sections operatively connected to the driven shaft compensating for changes in torque imparted to the pulley sections comprising: an energy accumulator, means connected between one of the pulley sections and the energy accumulator rotatable about the axis of the driven shaft for transmitting torque to the energy accumulator including an eccentric ring, a first transmission element adapted to be rotatably driven about the axis of rotation of the driven shaft, an eccentric lever connected to the first transmission element for rotation about an axis parallel to the axis of rotation of the driven shaft, a second transmission element interconnecting the eccentric lever with the driven shaft for driving the latter whereby rotation of the eccentric ring varies the position of the axis of rotation of the eccentric lever which in turn varies the torque transmitted to the driven shaft. The eccentric lever employed preferably includes a circular disc having a groove and a pin extending parallel to the axis of rotation. The eccentric ring is connected to a support bearing for rotation therewith. A second groove displaceably guides a second pin also extending parallel to the axis of rotation which is the point at which the torque from the energy accumulator acts on the eccentric lever. The pin of the circular disc is displaceably guided in a groove of a hub plate which is connected to a driven shaft for rotation therewith. The driven shaft is centered on the axis of rotation and both grooves having radially extending directional components (control portion).

It is advantageous for a force transmission part to have a transmission element in addition to the support bearing, and for the tranmission element and the support bearing to be arranged angular displacement relative to each other about the axis of rotation; a twisting force is exerted by the energy accumulator and the pin guided in the groove of the circular disc of the control portion is situated on the transmission element.

To provide an automatic torque converter, an infinitely variable gear system may be controlled by the angular displacement between the support bearing of the force application part and the driven shaft. The force element and the control element concomitantly transmit the torque required momentarily from the gear system to the driven shaft, whilst simultaneously controlling the transmission ratio of the infinitely variable gear system in such manner that the power transmitted remains constant.

An energy accumulator providing a constant torsional force which is approximately independent of its twist angle and may be situated in the force application part. A force application part whose energy accumulator produces a torsion force as a function of its twist angle, may be co-ordinated with a second force application part whose transmission element is connected for rotation with the shaft, the support bearings of the two force application parts being connected in rotation. In this device, the magnitude of the torque transmitted may also be varied during operation.

The invention will now be described with respect to the drawings. The force application part and the control portion are combined correspondingly, into an automatic torque converter or automatic output or driven plate, with different structural elements in each case. With exception of FIGURE 3, the initial position is illustrated in each embodiment.

Figure 1:
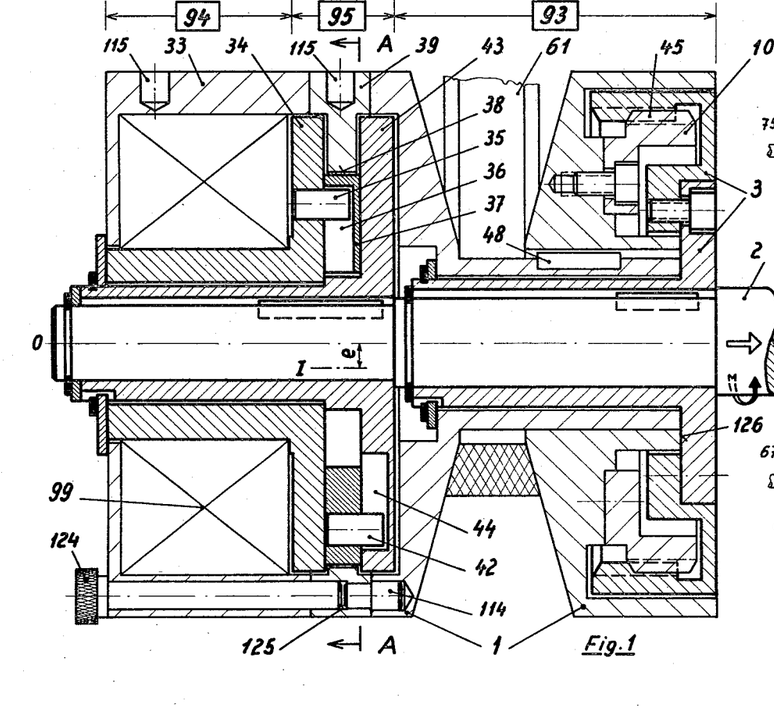
FIGURE 1 shows an automatically controlled driven plate.

FIGURE 1 shows an atuomatically controlled driven plate which includes an energy accumulator 22. Cone pulleys 1 operating throughout the control range transmit torque to the energy accumulator 99 which has a torque characteristic directly proportional with its angle of twist, which torque is stored to be later transmitted to the driven shaft 2 by the energy accumulator. The energy accumulator 99 is most simply embodied in a torsion spring, e.g. a flat spiral spring (clock spring) and acts in the direction of rotation shown, on the transmission element 34 against the direction of rotation of the support bearing 33.

Torque is transmitted throug a V-belt or a V-section chain belt 61 to the cone pulley sections 1, by a pair of conventional opposing plates, for example by a pair of cone pulley sections whose conical sections are rotatable together and arranged to be displaceable relative to each other in the axial direction by means of springs. Support bearing 33 is rotatable with the composite cone pulleys by means of bolts or the like 114 and of a guide pin 124. Torque is then transmitted to a transmission element 34 which is rotatably arranged on the shaft 2, in the direction of rotation shown, through the energy accumulator 99. The transmission element 34 has a pin 35 which engages in a radial groove 36 of a circular plate 37 which acts as a lever and is arranged eccentrically on the support bearing 33. The circular plate 37 is rotatably arranged in the eccentrically located bore 38 in an eccentric ring 39. The eccentric ring 39 is connected for rotation with the support bearing 33 by means of the locking pin 124.

The circular plate 37 is equipped with a pin 42, which engages in the radial groove 44 in a hub plate 43 which is connected for rotation with the shaft 2 and the plate 37 transmits the torque to the shaft 2 in the direction of rotation shown. By relative angular displacement of the cone pulley sections 1 through 180° in the direction of rotation shown (the support bearing 33 and the eccentric ring 39 being turned simultaneously), the circular plate 37 eccentrically arranged in the eccentric ring 39 rotates about its axis of rotation I relative to the eccentric bore 38 of the eccentric ring 39 through a semi-circle having the radius $e$ (eccentricity); accordingly, the transmission between the energy accumulator 99 and the shaft 2 is varied thereby. At the same time, the distance between the cone pulley sections 1 is reduced by the relative angular displacement of the cone pulley sections about the shaft 2 by means of a right-hand thread 45 so that the rotational speed transmitted to the pair of cone pulley sections 1 is reduced. The right-hand thread 45 is self-locking in the axial direction and may be a standard screw thread.

The cone pulley sections 1 are arranged for rotation with each other by means of a key 48. The maximum spacing between the cone pulley sections is determined by the axially operative abutment face 126 of the hub 3. The energy accumulator 99 on the hub 3 acts through the right-hand thread 45 when driving force is lacking. Cone pulley sections 1 are co-axially screwably mounted on the hub 3 for relative movement between the pulley sections and the hub 3. The hub 3 is of two-piece construction and includes a hub portion and a threaded portion. The side cone pulley section located at the right also has a screw threaded portion 10.

The conical dimensions of the cone pulley sections depend on the V-belts or V-section chain belts available commercially. The pitch of the thread 45 is such that a rotation of the cone pulley sections in unison through 180° results in desired axial displacement. It is appropriate in this connection for the helix angle of the thread to be as shallow as possible so that the thread diameter is as great as possible. The two cone pulley sections may also be arranged on oppositely directed threads.

So that the initial loading of the torsion spring 99 may be adjusted, the support bearing 33 and the eccentric ring 39 are provided with several radial bores 115. After adjusting the initial loading or of angular displacement between the support bearing 33 and the eccentric ring 39, the locking pin 124 is then inserted again into one of the numerous bores 125 in the eccentric ring. The momentary displacement in position may then be shown on a scale arranged on the periphery.

Figure 2:
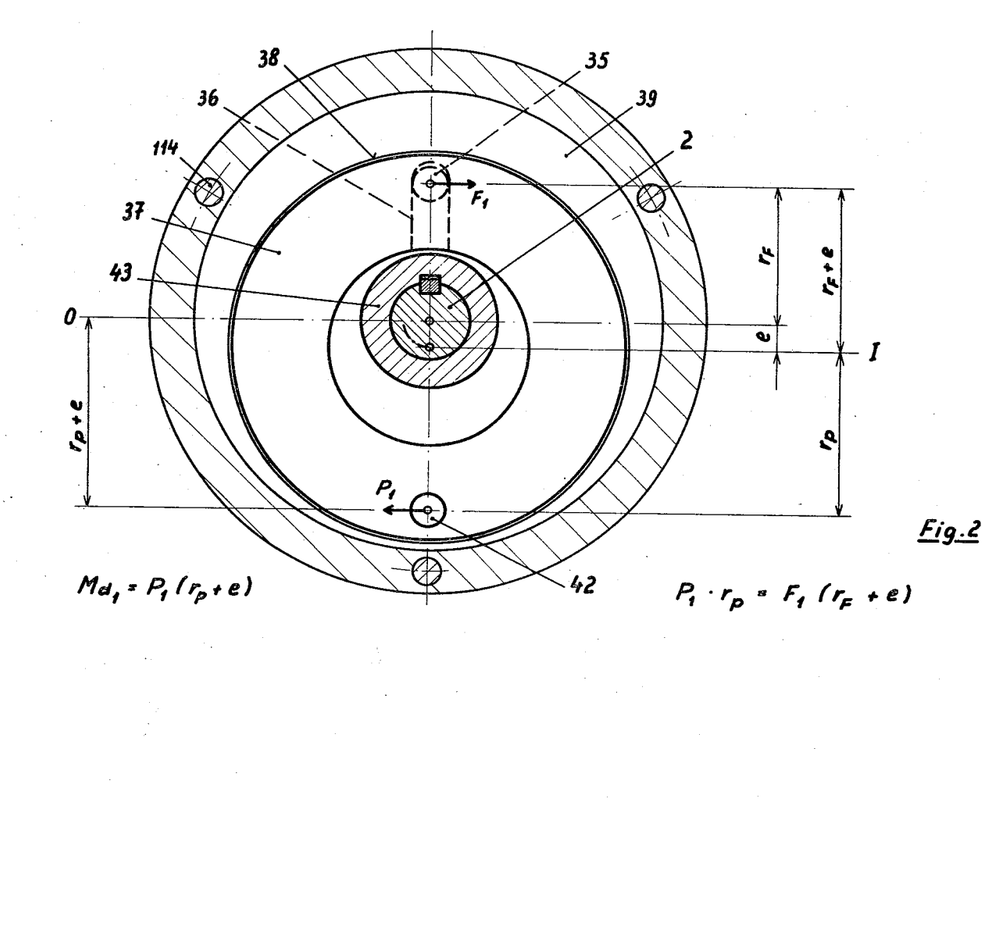
FIGURE 2 shows the driven plate shown in FIGURE 1 along section line A—A corresponding to the cone pulley sections furthest away from one another.

FIGURE 2 shows the section A—A of an automatically controlled driven plate illustrated in FIGURE 1, in the initial position, with maximum spacing between the cone pulleys. Tangential force $F_1$ of the pin 35 is effected by the energy accumulator 99, creates a tangential force $P_1$ on the pin 42 through the axis of rotation I of the eccentric ring 39.

Related to the axis of rotation I of the plate 37, $$P_1 \cdot r_D = F_1 \cdot (r_F + e)$$

$r_F$ being equal to the radial distance of the pin 35 from the axis of rotation O of the assembly, $r_D$ being equal to the radial distance of the pin 42 from the axis of rotation I of the lever 37, $e$ being the eccentricity of the eccentric ring 39 or the distance between the axis of rotation I and the axis of rotation O of the assembly.

Related to the axis of rotation O of the assembly, the torque transmitted to the shaft 2 by the pin 42 through the hub plate or other transmission element 43, which now corresponds to the torque $(Md)_1$ of the driven plate, is $$(Md)_1 = P_1 \cdot (r_D + e)$$

or $$Md_1 = \frac{F_1 \cdot (r_F + e) \cdot (r_D + e)}{r_D}$$

Figure 3:
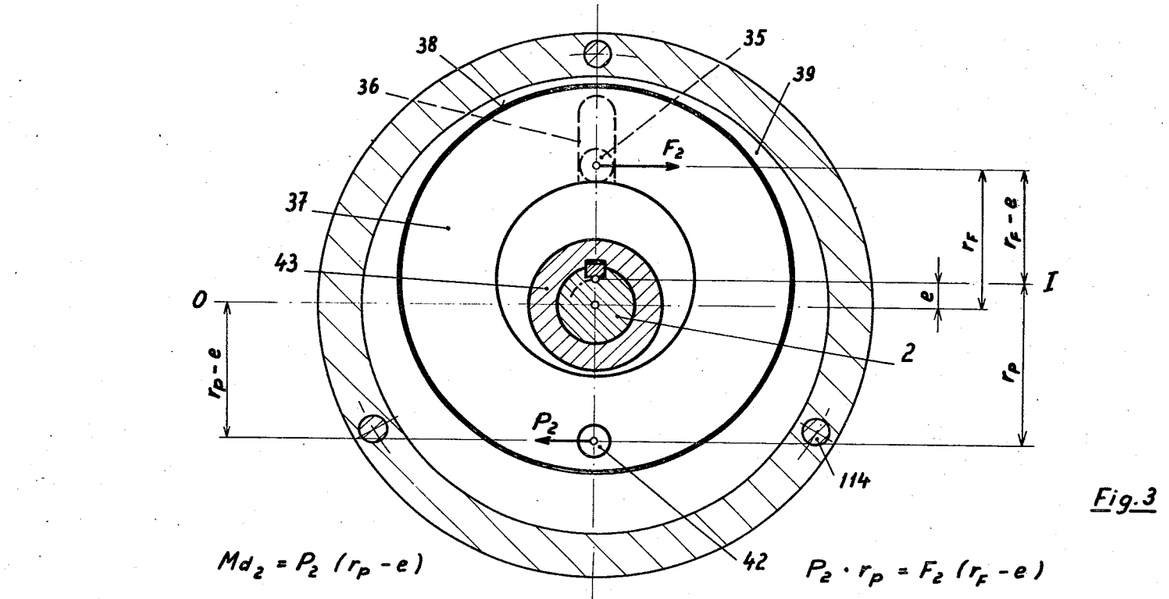
FIGURE 3 shows the driven plate shown in FIGURE 1 along section line A—A corresponding to the cone pulley sections closet to one another.

FIGURE 3 shows the section A—A of a driven plate according to FIGURE 1 in the closed position of the cone pulley sections, that is to say for maximum nominal diameter. The relative angular displacement of the cone pulley sections about the shaft through 180° caused a torsion spring 99 to increase its torsional force directly proportional to its angle of displacement, thus causing a tangential force $F_2$ on the pin 35.

Related to the axis of rotation I, $$P_2 \cdot r_D = F_2 (r_F - e)$$

and the torque $(Md)_2$ transmitted to the driven shaft 2 by the pin 42 is $$(Md)_2 = P_2 (r_D - e)$$

or $$Md_2 = \frac{F_2 (r_F - e)(r_D - e)}{r_D}$$

So that the torque of the driven plate may remain constant throughout the control range, the spring characteristic or initial loading should be arranged in such manner that:

$$(Md)_1 = (Md)_2$$

$$\frac{F_1 (r_F + e)(r_D + e)}{r_D} = \frac{F_2 (r_F - e)(r_D - e)}{r_D}$$

or $$\frac{F_1}{F_2} = \frac{(r_F - e)(r_D - e)}{(r_F + e)(r_D + e)} = \frac{\text{initial torque of the spring}}{\text{final torque of the spring}}$$

The torque variations resulting mandatorily between the two terminal positions of the cone pulley sections for rectilinear extension of the radial grooves 36 with respect to 44, may be corrected by arranging at least one of the two radial grooves such as the groove 36, for example, to have a curvilinear form differing from rectilinear radial extension.

If, for example, $r_F$ is 43/32″, $r_D$ is 103/64″, and $e$ is 33/128″, the initial loading of the torsion spring 99 should be set in such manner as to establish a spring torque ratio of $$\frac{(r_F - e)(r_D - e)}{(r_F + e)(r_D + e)} = \frac{1}{2}$$

By reducing the initial loading, torque characteristic is obtained which increases with the angle of twist, and conversely, an increase in initial loading causes a dropping torque characteristic.

The driven plate shown in FIGURE 1 is particularly appropriate for an unreeling gear, since output r.p.m. remains constant.

So that this driven plate may be appropriate for a winding gear, a vehicle propulsion system or the like, eccentric ring 39 need merely be arranged 180° displaced from the position shown in the previous embodiment, so that the torque transmitted from the energy accumulator 99 to the shaft 2 is not decreased but increased by the rotation of the eccentrically arranged circular plate 37.

Assuming that the torque of the spring 99 is doubled between the initial position and the final position of the cone pulley sections, the result with an eccentric ring 39 displaced through 180° from that of the previous embodiment, for identical levers eccentricity is a torque ratio of $$\frac{(Md)_1}{(Md)_2} = \frac{F_1}{F_2} \frac{(r_F - e)(r_D - e)}{(r_F + e)(r_D + e)} = \frac{1}{2} \cdot \frac{1}{2} = \frac{1}{4}$$

This corresponds to a control range of 4:1 for the output r.p.m., in order to transmit identical power constant in both terminal positions, wherein the automatically controlled driven plate has a nominal diametric ratio of 2:1, and the sprung driving spreader pulley is constructed to the same proportions.

The transmission of power may also be kept precisely constant in the intermediate positions of the cone pulley sections in this case, if the two grooves 36 and 44 have an appropriate configuration.

Figure 4:
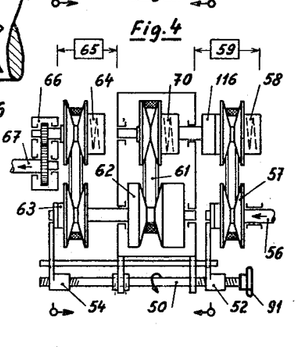
FIGURE 4 shows a winding mechanism, in which the power transmission may be varied during operation by means of two infinitely variable gear mechanisms, and the driving system is protected by an overload clutch.

FIGURE 4 shows a winding system, in which transmission of power may be in infinitely variable manner by means of two infinitely adjustable transmission systems 59 and 65.

A shaft 56 running synchronously with a web of fabric to be wound, transmits driving torque through an infinitely variable gear 59 to a torque converter, which consists of a sprung spreader pulley 70 and an automatically controlled driven plate or output plate 62 as shown in FIGURE 1. The automatically controlled driven plate 62 then transmits driving torque to a winding shaft 67 through an infinitely variable gear 65 and a reduction gear 66.

As the diameter of the roll or coil on the winding shaft increases, the speed of revolution of the winding shaft 67 diminishes, as well as that of the driven plate 62, owing to relative angular displacement of the cone pulley sections 1 about the shaft 2. The torque of the driven plate 62 is increased at the same time in such manner that the transmission of power (torque × r.p.m.), and thus the tension of the web of fabric to be wound, remains constant. A shared setting mechanism, namely the screw-threaded spindle 50, is incorporated for control of the speed of revolution of the two infinitely variable gears 59 and 65, which varies the ratio of the gear 59 through the setting lever 52 and the ratio of the gear 65 through the setting lever 54, in such manner that the increase in speed of revolution of the one gear corresponds to the decrease in speed of revolution of the other gear in each instance.

As a result, the speed of revolution and thus the power transmitted by the automatically controlled driven plate 62 may be infinitely variable. A constant torque is transmitted through the sprung spreader pulley 70 irrespective of the momentary winding or, coiling diameter, or the power ratio with respect to the fabric tension set in each instance.

If an overload clutch 116 is situated between the infinitely variable gear 59 (driving gear) and the sprung spreader pulley 70, the clutch is arranged to slip in each instance after torque adjustment and whenever the transmission gear is overloaded by 20%.

Figure 5:
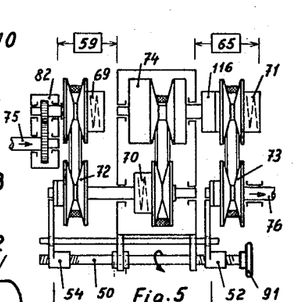
FIGURE 5 shows an unreeling device analogous to that of FIGURE 4.

FIGURE 5 shows an unreeling system comprising a driven plate 74 as illustrated in FIGURE 1, whose torque remains constant throughout the control range, since the shaft 76 running synchronously with the web of fabric is maintained at a constant speed of revolution.

In the case of an unreeling mechanism, the rotational speed of the unreeling shaft 75 diminishes as the roll or coil diameter decreases. The flux of force which originates from the web of fabric is transmitted by the unreeling shaft 75 to the shaft 76 which runs synchronously with the web of fabric.

In this case, the overload clutch 116 is situated between the automatically controlled driven plate 74 having a constant torque, and the infinitely variable gear 65 (driven or output gear).

The power ratio remains constant during the unreeling operation, but may be regulated in the same way as already described with respect to FIGURE 4, i.e., by means of the screw-threaded spindle 50, which may also be coupled with a compensating roller control system, if there is a risk of imbalance of the roll or coil.

Figure 6:
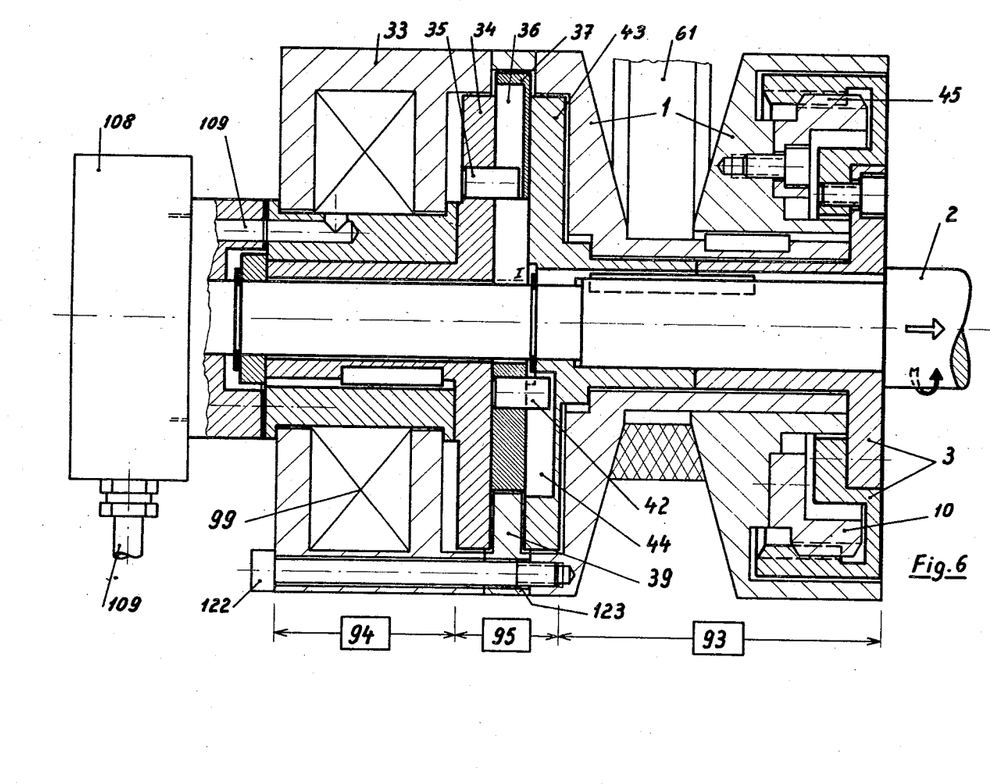
FIGURE 6 shows an automatically controlled driven plate comprising a force application part having a constant torque characteristic with the transmission of the torque output being adjustable.

FIGURE 6 shows an automatically controlled driven plate, in which the torque transmitted to the shaft 2 by the cone pulley sections 1 varies in inverse ratio to the output r.p.m., although the energy accumulator 99 transmitting the driving torque creates a constant torsional force independent of its angular displacement.

The force application portion 94 comprising the energy accumulator 99 may for example consist of a rotary cylinder whose casing is formed by the support bearing 33 and which is acted upon by constant pressure through the pressure pipe 109 and the rotary joint 108. The leverage of the control portion 95 is so chosen in this case, that the torque transmitted to the shaft 2 from the force application portion 94 is increased by the relative angular displacement of the cone pulley sections 1 about the shaft 2 towards the closed position of the cone pulley sections.

If for example, $r_F$ is chosen equal to 27 mm. and $e$ equal to 10 mm., and for constant torsional force:

$$\frac{(Md)_1}{(Md)_2} = \frac{(r_F-e)(r_p-e)}{(r_F+e)(r_p+e)} = \frac{1}{4}$$

A gear having a control range of 4:1 may thus be controlled by means of a device for torque transmission consisting of a force application portion 94 of constant torsional force and of a control portion 95. If, as seen in the direction of force transmission, a second control portion 95 of identical structure were to be situated in front of the driven shaft, this would render it possible to control a gear having a control range of 16:1.

So that the nature of the output (constant, increasing or decreasing) may be effected, the eccentric ring 39 is provided with two or more elongated holes 123 extending in an axial direction, so that the eccentric ring may be turned through 30° for example, relative to the assembly. A screw 122 clamps the eccentric ring 39 to the support bearing 33 and the pulley sections 1.

The axis of revolution I of the lever 37 may thus be displaced in a direction perpendicular thereto. The pitch of the thread 45 should then be such that an angular displacement of the cone pulley sections of 180°−30°=150° corresponds to the range of axial adjustment relative to each other.

Figure 7:
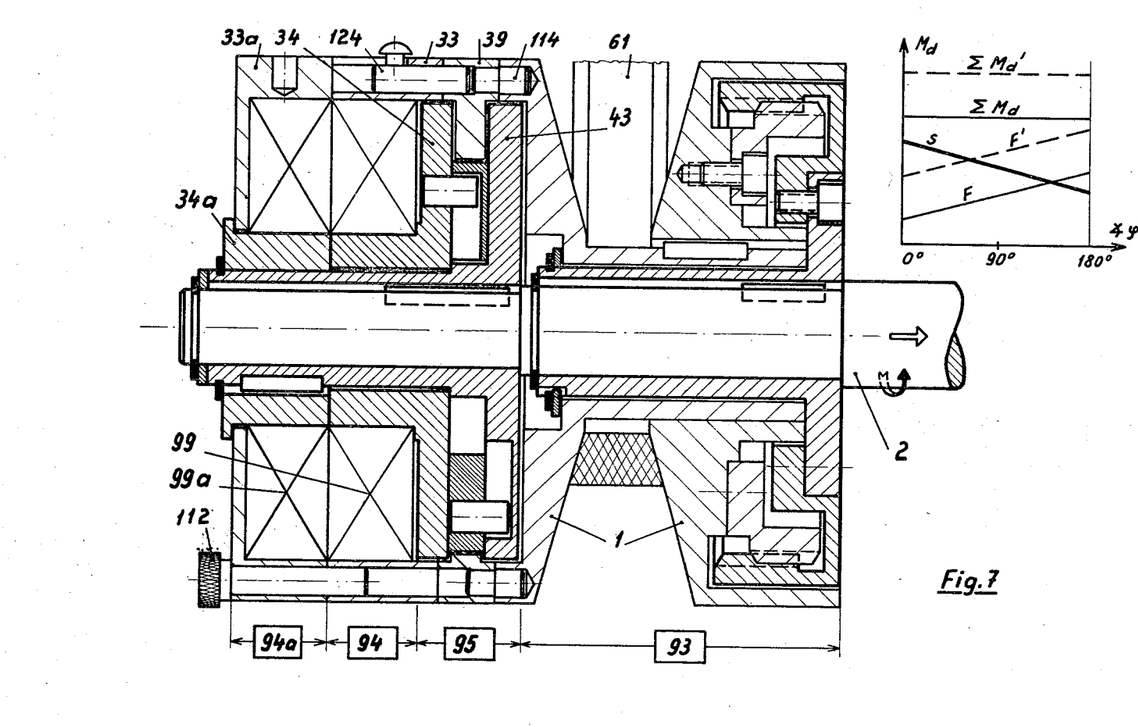
FIGURE 7 shows an automatically controlled driven plate having two forces application parts wherein one force application part acts directly on the driven shaft from the cone pulleys, and the other force application part acts on the driven shaft through a control element.

FIGURE 7 shows an automatically controlled driven plate whose output torque always remains constant, comprising two force application portions 94 and 94a each of which has an energy accumulator 99 and 99a respectively which is a torsion spring, preferably a flat spiral spring having a spring characteristic such that the torsional force is direclty proportional to the angle of twist. This embodiment of the driven plate is particularly appropriate for an unreeling mechanism and, by contrast to the embodiment of FIGURE 1, it is constructed in such manner that the torque transmitted to the shaft 2 may be varied. This is accomplished by the force application portion 94 transmitting a torque which is inversely proportional to the angle of twist, to the shaft 2 through the control portion 95. Whereas the force application portion 94a, which is connected for rotation with the shaft 2 by the transmission element 34a, acts directly on the shaft 2 with linearly increasing torsional force through the energy accumulator 99a.

The sum of the torques $Md$ transmitted to the shaft 2 is constant in each instance in the case of a torque behaviour S (control curve) inversely proportional to the angle of twist respectively rising torque behaviour F (spring characteristic).

If the locking pin 112 is pulled out and the support bearing is rotated in the direction of rotation shown, meaning the support bearing 33a, the initial loading of the energy accumulator 99a is increased by the force application portion 97a.

Depending on the newly established angular displacement between the support bearings 33 and 33a, the sum of the torques transmitted to the driven shaft is then increased to $Md'$, for example, and thus remains constant during the control sequence.

The nature of the torque may be varied by turning the support bearing 33 relative to the entire assembly, for which purpose a locking pin 124 is incorporated, and which may engage the eccentric ring 39 in different positions of angular displacement.

Figure 8:
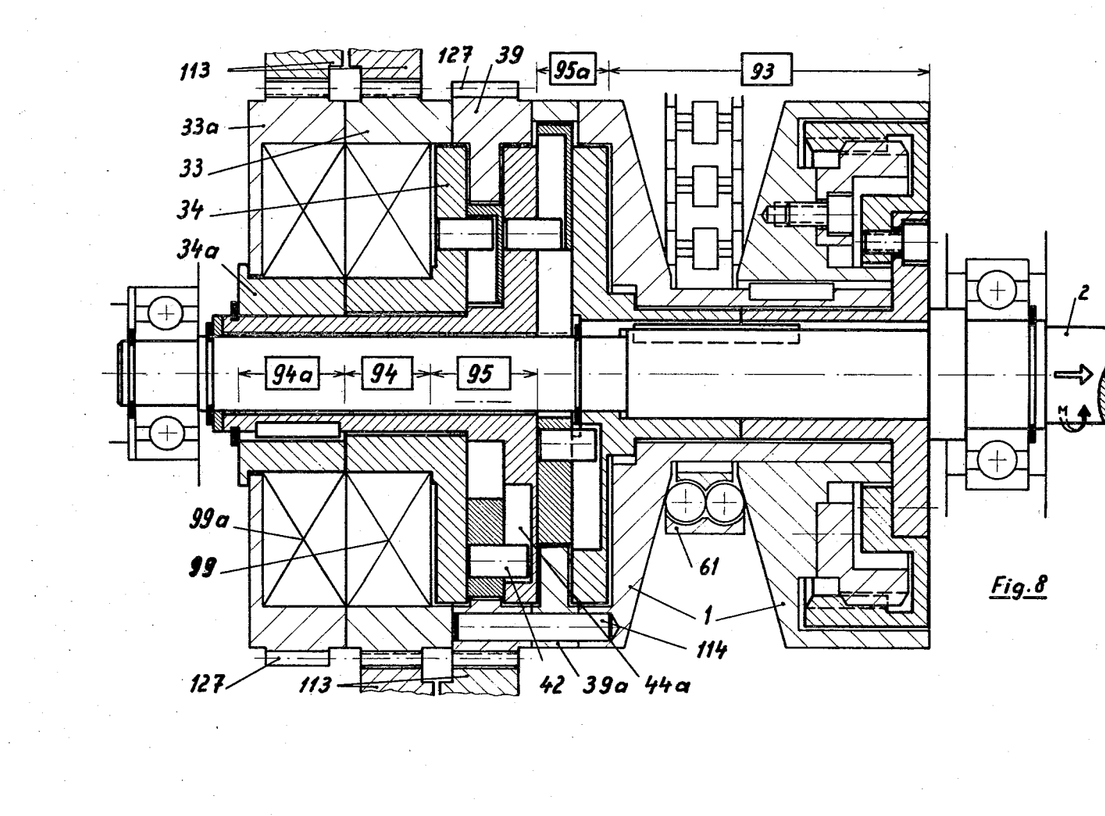
FIGURE 8 shows an automatically controlled driven plate like that of FIGURE 7, with an additional control element.

FIGURE 8 shows an automatically controlled driven plate, operated by spring force 99, whose torque varies inversely proportionally to the output rotational speed. It is thus appropriate for a vehicle propulsion system, a winding gear, and the like, and has the same force and control elements 94a, 94 and 95 as the driven plate according to FIGURE 7, through which a constant torque is transmitted.

The control element 95 does not however act directly on the shaft 2 but through a further control element 95a, the pin 42 of the control element 95 engages a groove 44a in the control element 95a. The control element 95a transmits a constant torque suitable for a winding gear or a vehicle propulsion system. In this case, the initial loadings of the energy accumulators 99 and 99a may be varied during operation by means of a setting mechanism 113 illustrated in FIGURE 9, to which end ring gears 127 are placed on the support bearings 33 and 33a and on the eccentric ring 39. A device of this nature for transmission of a torque may also be employed in combination with a servo-mechanism 113 for regulating r.p.m. of a conventional infinitely variable gear, in such a circumstance the setting mechanism should be situated between the cone pulley sections and the driven shaft for transmission of the control motion.

Figure 9:
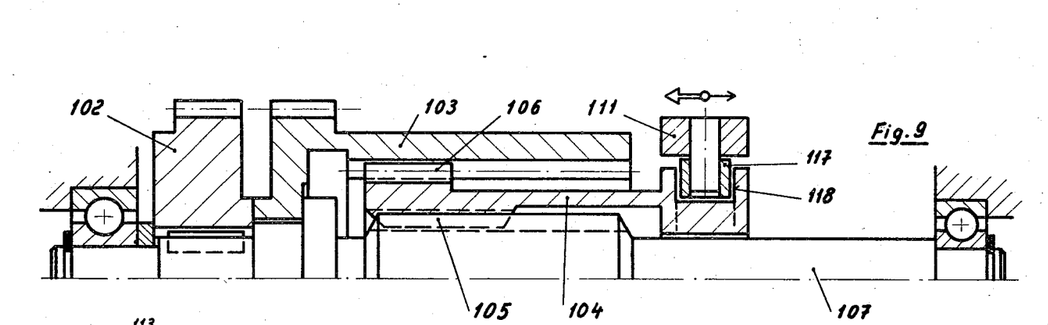
FIGURE 9 shows a setting mechanism for varying the output transmission of an automatically controlled driven plate illustrated in FIGURE 8, during operation.

FIGURE 9 is a detail of a setting mechanism in operation for adjusting the power transmission of an automatically controlled driven plate operated by energy accumulator 99 as illustrated in FIGURE 8. The angular displacement between the support bearing 33a and the support bearing 33 or the eccentric ring 39, and between the support bearing 33 and the eccentric ring 39, which remains constant during a control sequence, may thus be set by displacing a threaded sleeve 104. The threaded sleeve thus does not change its axial position during the control sequence. In this instance, the threaded sleeve may be in engagement with the gear 103 by means of straight teeth 106, and with the gear 102 by means of the coarse pitch thread 105.

The two gears 102 and 103 are displaced relative to each other by longitudinal displacement of the threaded sleeve 104 by means of a control lever 111 operable from outside the assembly and engaging a sliding block 117 in an annular groove 118 of the threaded sleeve.

So that the relative angular displacement of the two gears with respect to each other may be transmitted to a driven plate controlled by spring force, the gears 102 and 103 should have identical pitch diameters and the driven plate should be equipped with ring gears 127 having the same pitch circle diameters which are in each instance situated on the parts to be displaced relative to each other, namely the support bearings 33 and 33a and the eccentric ring 39.

Figure 10:
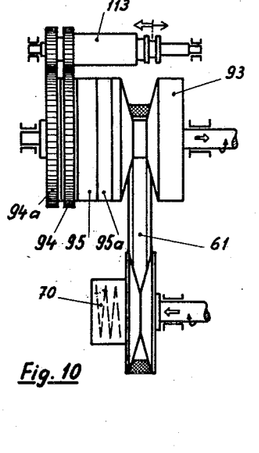
FIGURE 10 shows a torque converter controlled by spring force with a driven plate according to FIGURE 8 and a setting mechanism according to FIGURE 9.

FIGURE 10 shows a complete torque converter controlled by spring force, comprising an automatically controlled driven plate such as illustrated in FIGURE 8, and a setting mechanism 113 such as illustrated in FIGURE 9 for setting of power transmission during operation. In contrast to FIGURE 9, the force element 94 and the control element 95 are interconnected for rotation with one another at the driving side, since as a rule the power transmission pattern, once it has been set, need not be changed. The threaded 104 of the setting mechanism need not be axially displaced to affect the control sequence. The torsional force between the cone pulley sections and the control element may also be replaced by a control force acting axially on the threaded sleeve 104.

Figure 11:
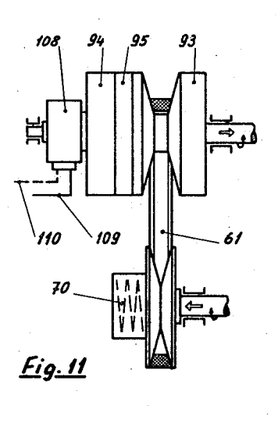
FIGURE 11 shows a hydraulically or pneumatically controlled torque converter.

FIGURE 11 shows a hydraulically or pneumatically controlled torque converter comprising an automatically driven plate such as shown in FIGURE 6. A constant hydraulical or penumatical pressure is transmited through the pressure line 109 and the rotary joint 108 into the force element 94 constructed as a rotary cylinder for example, and produces a constant torsional force.

In an embodiment actuated by hydraulic fluid, the side of the rotary cylinder is filled with unpressurised hydraulic fluid as well through the duct 110, in order to prevent imbalance.

A positive control may also be exercised over the speed of revolution by two ducts 109 and 110. If the ducts 109 and 110 are used as current supply conductors and the rotary joint 108 as a slip ring unit, it is also possible to produce constant torsional force in the force element 94 by means of eddy currents or the like.

Figure 12:
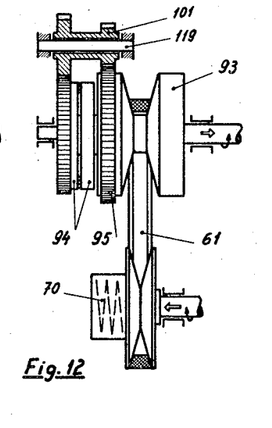
FIGURE 12 shows a torque converter controlled by constant torsional forces.

FIGURE 12 also shows a torque converter comprising a driven plate such as the type illustrated in FIGURE 6. The constant torsional force is brought about by a friction clutch, an eddy current clutch, a hydraulic clutch or the like, a pair of gears 101 of the step-up type arranged on a stationary shaft 119, being situated between the pulleys and the driving portion of one of these clutches forming the force element 94.

The transmission of power may also be regulated in this case by varying the torque of the corresponding clutch.

Figure 13:
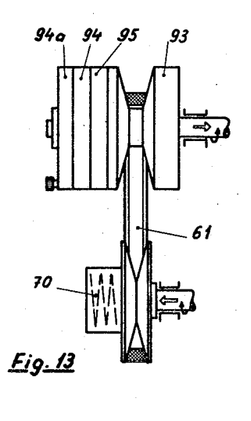
FIGURE 13 shows an unreeling gear controlled by spring force.

FIGURE 13 shows an unreeling gear controlled by spring force, comprising an automatically controlled driven plate such as shown in FIGURE 7.

Figure 14:
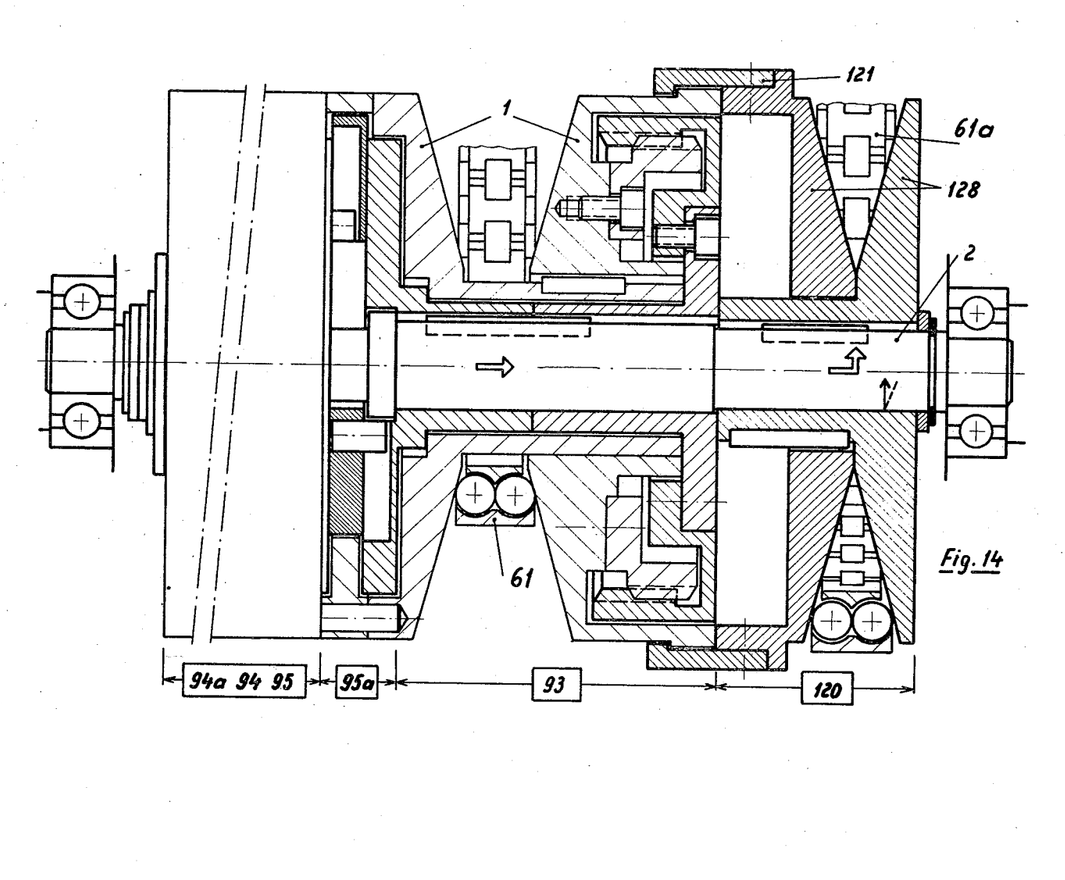
FIGURE 14 shows an automatically controlled driven plate according to FIGURE 8, which also controls a mechanically adjustable expanding plate at the same time.

FIGURE 14 shows an automatically controlled driven plate such as shown in FIGURE 8, which also controls a mechanically controllable spreader pulley 120. The control range of the entire transmission system is thus increased by four times for cone pulleys of identical proportions.

In this case, the driving torque is transmitted from a unilaterally sprung spreader pulley (not shown), through a V-belt or a V-section chain belt 61, the cone pulley sections 1, the force and control elements 94a, 94, 95 and 95a, to the shaft 2 and then to the mechanically controllable spreader pulley 120 connected for rotation with the shaft. Pulley 120 in its turn transmits drive through a V-belt or a V-section chain belt 61 to a unilaterally sprung spreader pulley or the like.

For example, the two cone pulleys 1 and 128 are angularly displaceable relative to each other and are joined together by a collar ring 121 so that they may be axially displaced together, if an increase in torque occurs, the cone pulleys 1 and 128 are displaced towards the left, so that the speed is reduced.

The torque transmitted by the shaft 2 is the transmitted

The torque transmitted by the shaft 2 is transmitted belt 61a, by a change in diameter of the mechanically controlled spreader pulley 120 or of the sprung spreader pulley. If the control range of a single belt or chain belt drive is 4:1 for example, than the overall control range of 16:1, or if the individual control range is 9:1 then the overall control range is 81:1.

The individual components, being the force element 94, control element 95, adjustable gear 93 and spreader pulley 120, and may be combined to form a variety of driving units. It may thus be considered appropriate for the structural components to be constructed and assembled according to the building set principle, in order to ensure production methods and feasibility.

The possible combinations are evidently not limited to the embodiments described hereinabove by way of example. A force element 94a equipped with a torsion spring, may be combined with an adjustable gear 93, the cone pulleys then acting directly on the shaft 2 through the force element 94 including an energy accumulator formed as a spring, in order to automatically control the driven plate. Such a combination is highly desirable for driving systems in which the ratio between the input and output speeds of revolution remains substantially constant during the course of operation. Drive systems of this nature may be employed for example for the conveying system of a flexible web of fabric or for a periphery winding system. If, in this case, drive is transmitted for example from a mechanically controllable spreader pulley running synchronously with the web of fabric, through a single-acting or double-acting V-belt, to one or more automatically controlled driven plates consisting of a force element 94a and an adjustable gear 93 and arranged in each instance on a feed roller or a peripheral winding roller, the tension of the product may be changed by varying the diameter of the mechanically adjustable spreader pulley. The automatically controlled driven plate will concomitantly and automatically change its nominal diameter by relative angular displacement of the cone pulley sections about the shaft, with simultaneous torque variation, in such manner that the output speed of revolution always corresponds to the speed of the web of fabric. A tensioning roller must however be arranged at an appropriate point of the belt drive system. The angle of torsional displacement between the two terminal positions of the cone pulley sections may be increased as desired, and even beyond 180°. Fluctuations in the speed of the web of fabric, caused by different stretching or shrinking, are counteracted by the force element 94a which at the same time acts as a control element for varying of the transmission ratio.

In an application involving a static problem for example, a device for transmission of a constant adjustable torque illustrated in FIGURE 7 and consisting of the force elements 94 and 94a as well as of the control element 95, may also be employed very satisfactorily for mass balancing.

A force element 94 which acts on the shaft 2 through at least one control element with progressive torque evolution, may moreover be taken to represent a torsion spring element appropriate for oscillation-damping suspension of a self-propelled vehicle.

The energy accumulators in the embodiments described bears directly against a part arranged to be rotatable about the shaft, that is to say a support bearing, and indirectly on the shaft 2 through an eccentrically situated lever. In this arrangement, the lever constructed in the form of a circular plate, should be arranged eccentrically in an eccentric ring 39 which is rotatably connected to the said support bearing. If the energy accumulator were to bear direct on the shaft 2 and indirectly through an eccentrically arranged lever against a part arranged to be rotatable about the shaft, the lever would have to be constructed in the form of a circular ring disc and to be situated eccentrically on the shaft. The principle of control of the transmission ratio would not be changed thereby.

I claim:
1. In a variable torque transmission device for transmitting torque from a pair of pulley sections to a driven shaft comprising: means connected for rotation with the pulley sections about the axis of rotation of the driven shaft, including an eccentric ring, a lever eccentrically arranged for rotation by the eccentric ring about an axis parallel to the axis of rotation of the driven shaft, a pair of transmission elements connected for rotation with the eccentric lever about the axis of rotation of the driven shaft, one of the transmission elements arranged for driving the eccentric lever and the other transmission element connected to the driven shaft and arranged to be driven by the eccentric lever so that due to rotation of the eccentric ring the position of the axis of rotation of the eccentric lever varies which in turn varies the torque transmitted to the driven shaft.

2. A variable torque transmission device of the type including a pair of pulley sections, a driven shaft operatively connected to the pulley sections for rotation about its axis, means for adjusting the distance between the pulley sections operatively connected to the driven shaft compensating for changes in torque imparted to the pulley sections comprising: an energy accumulator, means connected between one of the pulley sections and the energy accumulator for rotation about the axis of the driven shaft for transmitting torque to the energy accumulator including an eccentric ring, a first transmission element adapted to be rotatably driven about the axis of rotation of the driven shaft, an eccentric lever connected to the first transmission element for rotation about an axis parallel to the axis of rotation of the driven shaft, a second transmission element interconnecting the eccentric lever with the driven shaft for driving the latter whereby rotation of the eccentric ring varies the position of the axis of rotation of the eccentric lever which in turn varies the torque transmitted to the driven shaft.

3. A variable torque transmission as claimed in claim 2, wherein the means for adjusting the distance between the pulley sections includes a self-locking screw thread having a normal screw thread with a constant pitch.

4. A device as claimed in claim 2, wherein the means connected between one of the pulley sections and the energy accumulator also includes a support bearing connected between the eccentric ring and the energy accumulator and securing means are provided for positioning the eccentric ring relative to the support bearing in a plurality of angular positions.

5. In a variable torque transmission as claimed in claim 4, wherein the said energy accumulator tends to increase the output speed of the driven shaft.

6. A device as claimed in claim 5, wherein the energy accumulator may be initially loaded by angularly displacing the support bearing relative to the said one of the transmission elements, and is fixed after the angular displacement.

7. A variable torque transmission as claimed in claim 4, wherein a pressurisable rotary cylinder having a pressure pipe passed through a rotary joint is formed in the support bearing.

8. A device as claimed in claim 4, wherein the angular position of the eccentric ring with respect to the means connected for rotation with the pulley determines the initial loading of the energy accumulator which is formed as a torsion spring.

9. A device as claimed in claim 8, wherein the eccentric ring includes an eccentrically positioned circular bore and the eccentric lever is formed as a circular disk disposed substantially within the said bore.

10. A device as claimed in claim 9, wherein the transmission elements are each formed as a hub including a cylindrical portion extending along the driven shaft axis and a hub plate extending radially from the cylindrical portion and wherein the eccentric lever is connected to each of the hub plates in each transmission elements by co-operating pin and guide means.

11. A device as claimed in claim 10, wherein one groove and one pin are located in the eccentric lever displaced 180° from each other; and the pins are axially extending and one groove is radially extending.

12. A device as claimed in claim 8, further comprising a further support bearing connected for rotation with the said support bearing, a further transmission element directly connected for rotation with the said second transmission element and a further energy accumulator operatively connected between the said further support bearing and the said further transmission element.

13. A device as claimed in claim 12, wherein a further eccentric ring and a further eccentric lever are provided, the further eccentric ring being connected for rotation with the said one of the pulley sections, the further eccentric lever being connected to the said second transmission element by guide and pin means and disposed within the eccentric bore in the further eccentric ring.

References Cited

UNITED STATES PATENTS

| | | | |
|---|---|---|---|
| 1,172,936 | 2/1916 | Burn | 74—69 |
| 2,128,560 | 8/1938 | Klimek | 74—63 |
| 2,159,372 | 5/1939 | Brosch | 74—63 |
| 2,364,393 | 12/1944 | Seeck | 74—69 |
| 3,224,287 | 12/1965 | Gesche et al. | 74—230.17 |
| 3,287,984 | 11/1966 | Neubauer | 74—69 XR |
| 3,295,381 | 1/1967 | Czarnecki | 74—69 XR |

FOREIGN PATENTS 854,136  11/1960  Great Britain.

FRED C. MATTERN, Jr., Primary Examiner
JAMES A. WONG, Assistant Examiner

U.S. Cl. X.R.
74—69, 571